(12) United States Patent
Misumi

(10) Patent No.: US 6,664,754 B2
(45) Date of Patent: Dec. 16, 2003

(54) MOTOR DRIVING CONTROL APPARATUS

(75) Inventor: Hiroyoshi Misumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 09/881,717

(22) Filed: Jun. 18, 2001

(65) Prior Publication Data
US 2002/0011816 A1 Jan. 31, 2002

(30) Foreign Application Priority Data
Jun. 22, 2000  (JP) ........................................ 2000-187683

(51) Int. Cl.⁷ ................................................ H02P 8/00
(52) U.S. Cl. ........................................ 318/696; 318/599
(58) Field of Search ............................... 318/599, 254, 318/439, 685, 696

(56) References Cited

U.S. PATENT DOCUMENTS

| | | | | |
|---|---|---|---|---|
| 5,194,796 A | * | 3/1993 | Domeki et al. | 318/685 |
| 5,309,075 A | * | 5/1994 | Yokoe et al. | 318/608 |
| 5,432,424 A | * | 7/1995 | Takahashi | 318/432 |
| 6,150,788 A | * | 11/2000 | Someya | 318/439 |
| 6,326,748 B1 | * | 12/2001 | Moroto et al. | 318/254 |

* cited by examiner

Primary Examiner—Jeffrey Donels
(74) Attorney, Agent, or Firm—Fitzpatrick, Cella, Harper & Scinto

(57) ABSTRACT

A motor driving control apparatus for driving a motor repeats alternately the supply of current to the motor coil during the exciting period and the non-supply of current to the motor coil during the non-exciting period. For this apparatus, a short period is set to enable each of the feeding points of the motor coil to be short-circuited totally during the non-exciting period, and an open period is set to enable each of the feeding points to be totally in the open status during the open period.

18 Claims, 18 Drawing Sheets

PRE-DRIVER UNIT

PI CONTROL BLOCK

MOTOR DRIVING CONTROL APPARATUS

BACKGROUND OF THE INVENTION

1. Field of the Invention

The present invention relates to a motor driving control apparatus.

2. Related Background Art

Along with the development of switching technologies in recent years, it has become possible to drive a five-phase stepping motor by chopper driving. There is one chopper method used for the five-phase stepping motor, in which the chopper driving is performed in the PWM cycle in which the current distribution period for switching phases and the holding period of the current are made one cycle, and the current is controlled by controlling the holding period.

Also, there is another method in which the current control is effectuated by controlling the phase switching period Tms. With this method, the Tms period is controlled to become smaller if a motor is driven to rotate at a slower speed with a current that generates an adequate torque.

However, in the former case, if a motor is driven to rotate at a slower speed with a current that generates an adequate torque, the PWM period becomes greater. Then, the PWM frequency presents an audible range, which causes the motor to generate an abnormal sound.

Also, in the latter case, there is a limitation in a clock for generating the Tms period. As a result, the Tms is limited to the minimum period thereof, leading to inadequate current control when a motor is driven to rotate at a slow speed.

SUMMARY OF THE INVENTION

The present invention is designed in consideration of the problems discussed above. It is an object of the invention to provide a motor driving control apparatus capable of driving the motor to rotate at low speed with an adequate torque without generating any abnormal sound.

In other words, the present invention provides a motor driving control apparatus which comprises exciting means for supplying current from a power source to a motor coil, first setting means for setting an exciting period to supply current from the power source to the motor coil by the exciting means, second setting means for setting a non-exciting period not to supply current from the power source to the motor coil by the exciting means, and PWM means for repeating alternately the current supply to the motor coil during the exciting period set by the first setting means, and the non-supply of current to the motor coil during the non-exciting period set by the second setting means, and drives the motor by changing the exciting patterns of the exciting means. The motor driving controlling apparatus is further provided with third setting means for setting a short period to enable each of the feeding points of the motor coil to be short-circuited totally during the non-exciting period, and fourth setting means for setting an open period to enable each of the feeding points of the motor coil to be totally in an open status.

Also, the present invention provides a motor driving control apparatus which comprises exciting means for supplying current from a power source to a motor coil, first setting means for setting an exciting period to supply current from the power source to the motor coil by the exciting means, second setting means for setting a non-exciting period not to supply current from the power source to the motor coil by the exciting means, and PWM means for repeating alternately the current supply to the motor coil during the exciting period set by the first setting means, and the non-supply of current to the motor coil during the non-exciting period set by the second setting means, and drives the motor by changing the exciting patterns of the exciting means. The motor driving control apparatus is further provided with third setting means for setting a short period to enable each of the feeding points of the motor coil to be short-circuited totally during the non-exciting period, fourth setting means for setting an open period to enable each of the feeding points of the motor coil to be totally in open status, fifth setting means for setting the value of current flowing in the motor, detecting means for detecting the motor current flowing in the motor, sixth setting means for setting the current target value to make the motor current a desired current value, comparing means for comparing the motor current detected by the detecting means, and the target value set by the sixth setting means, and controlling means for controlling the motor current set by the fifth setting means in accordance with the result of comparison of the comparing means. The fifth setting means is provided with changing means for changing the open period set by the fifth setting means.

These and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS (First Embodiment)

Figure 1:
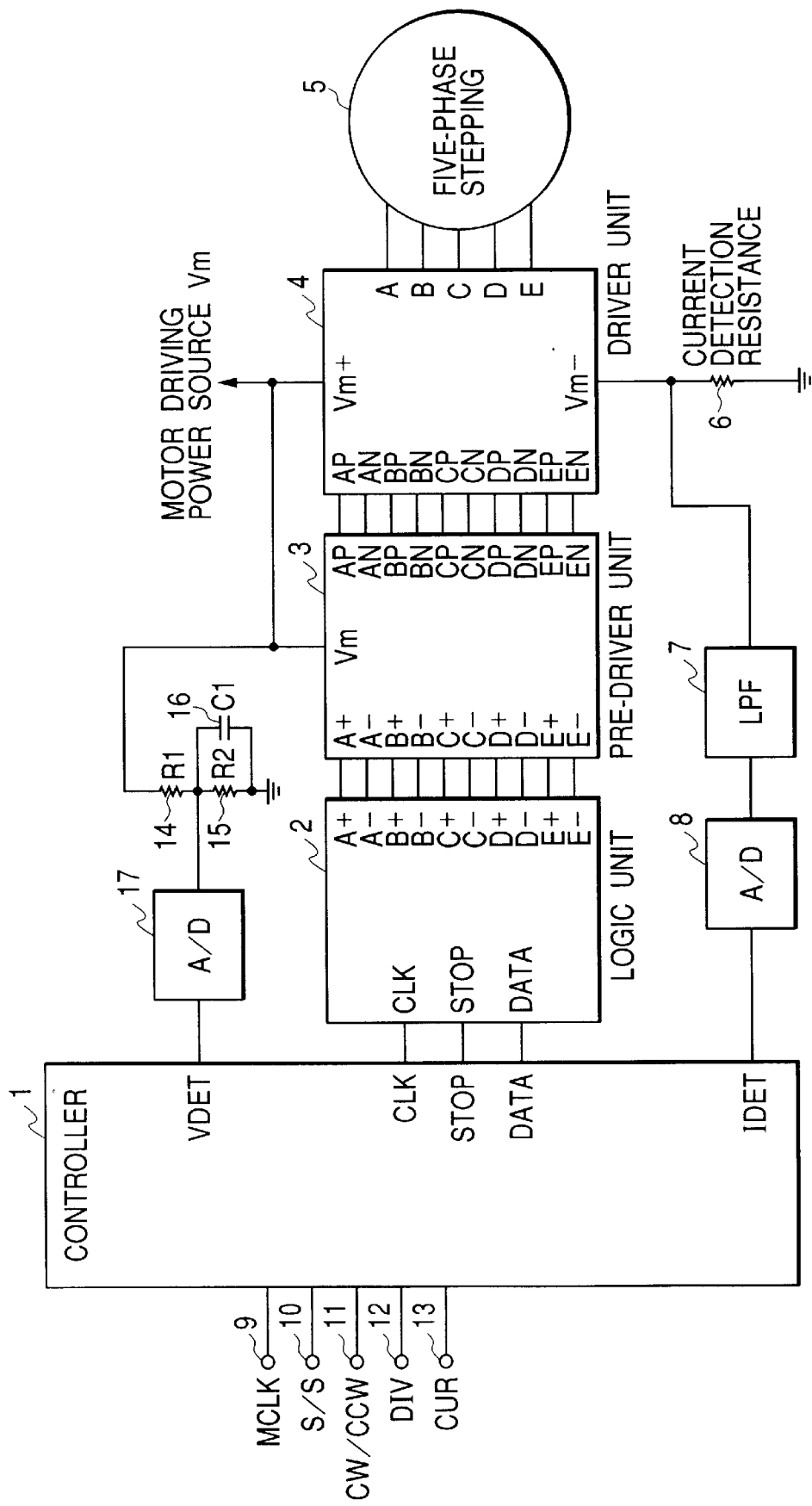
FIG. 1 is a block diagram which shows the entire body of a motor driving apparatus.

Now, the description will be made of a first embodiment in accordance with the present invention. FIG. 1 is a block diagram which shows the embodiment of the present invention. In FIG. 1, a reference numeral designates a five-phase stepping motor (hereinafter referred to as a motor); 1, a controller that controls the driving of the motor 5, structured by a microcomputer as an example; 2, a logic unit for generating driving pulses to drive the motor 5; 3, a pre-driver unit for voltage-converting driving pulses from the logic unit 2; 4, a driver unit for driving the motor 5 by supplying current to each feeding point of the motor 5 in accordance with the driving pulses from the pre-driver unit 3; 6, a current detection resistor (hereinafter referred to as an Rd) to detect the current which flows to the motor 5; 7, a low-pass filter (hereinafter referred to as an LPF) for smoothing the signals obtained by means of the Rd6; and 8, an A/D converter (hereinafter referred to as an A/D) for converting the analogue signals from the LPF 7 to digital signals.

A reference numeral 9 designates an MCLK input terminal for receiving a stepping pulse (hereinafter referred to as MCLK) from the outside to determine a stepping speed of the motor 5; 10, an S/S input terminal for receiving a signal (hereinafter referred to as S/S) which instructs a start/stop of the rotation of the motor 5; 11, a CW/CCW input terminal for receiving a signal (hereinafter referred to CW/CCW) which indicates the rotational direction of the motor 5; 12, a DIV input terminal for receiving a signal (hereinafter referred to as DIV) that indicates the division number of microstep; 13, a CUR input terminal for receiving a signal (hereinafter referred to as CUR) that indicates the current that flows in the motor 5; 14 and 15, resistors for dividing the power source voltage Vm; 16, a capacitor for removing noises of a signal divided by the R1 and R2; and 17, an AD converter for A/D converting the signal divided by the R1 and R2 for outputting it to the controller 1.

Figure 2:
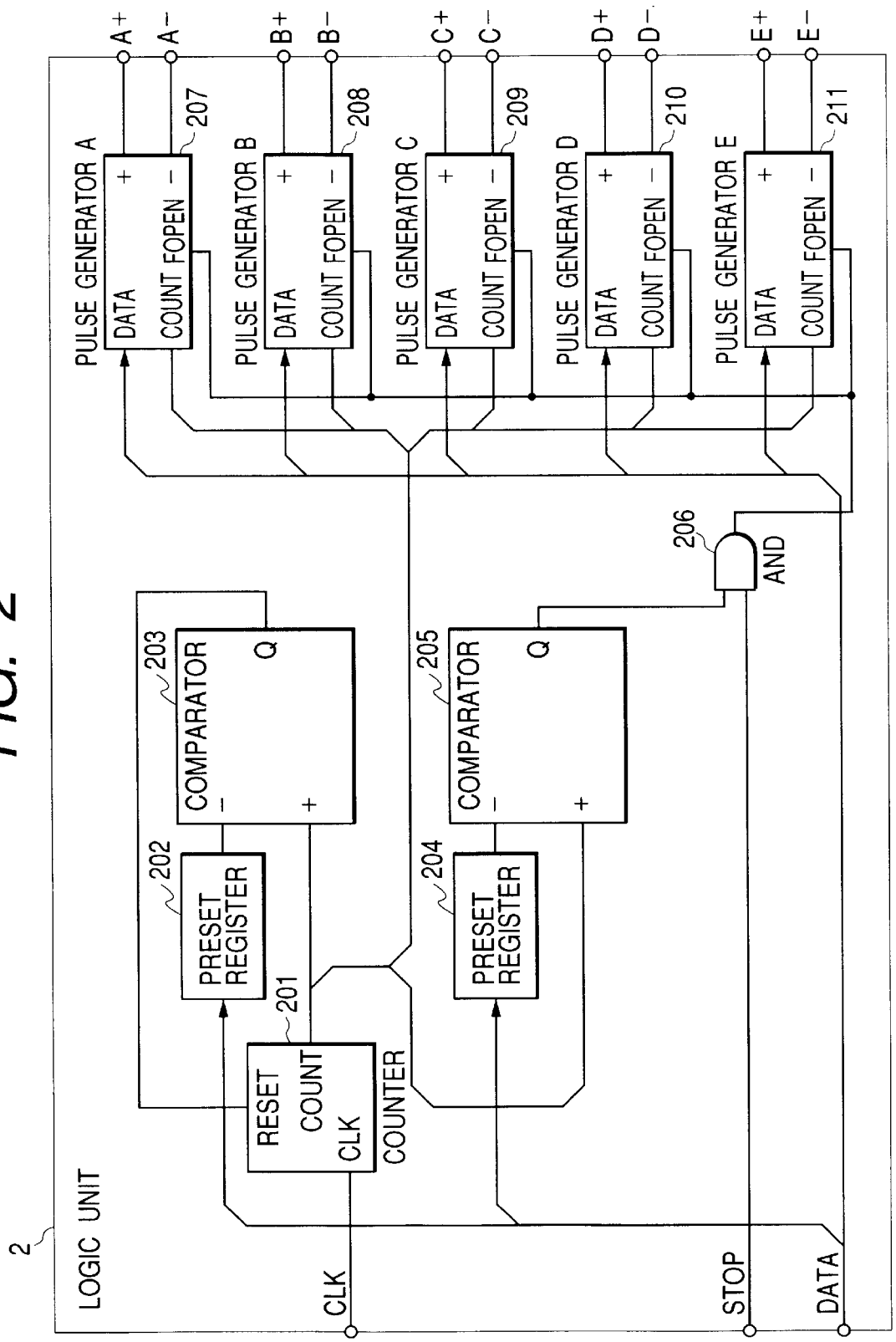
FIG. 2 is a block diagram which shows a logic unit.

FIG. 2 is a block diagram which shows the logic unit 2. Here, a reference numeral 201 designates a counter to be counted up by means of the CLK signal; 202 and 204, preset registers each for storing data and outputting the data thus stored; 203 and 205, comparators each for comparing two input data; 206, an AND gate; and 207 to 211, pulse generators each for generating a driving pulse.

Figure 3:
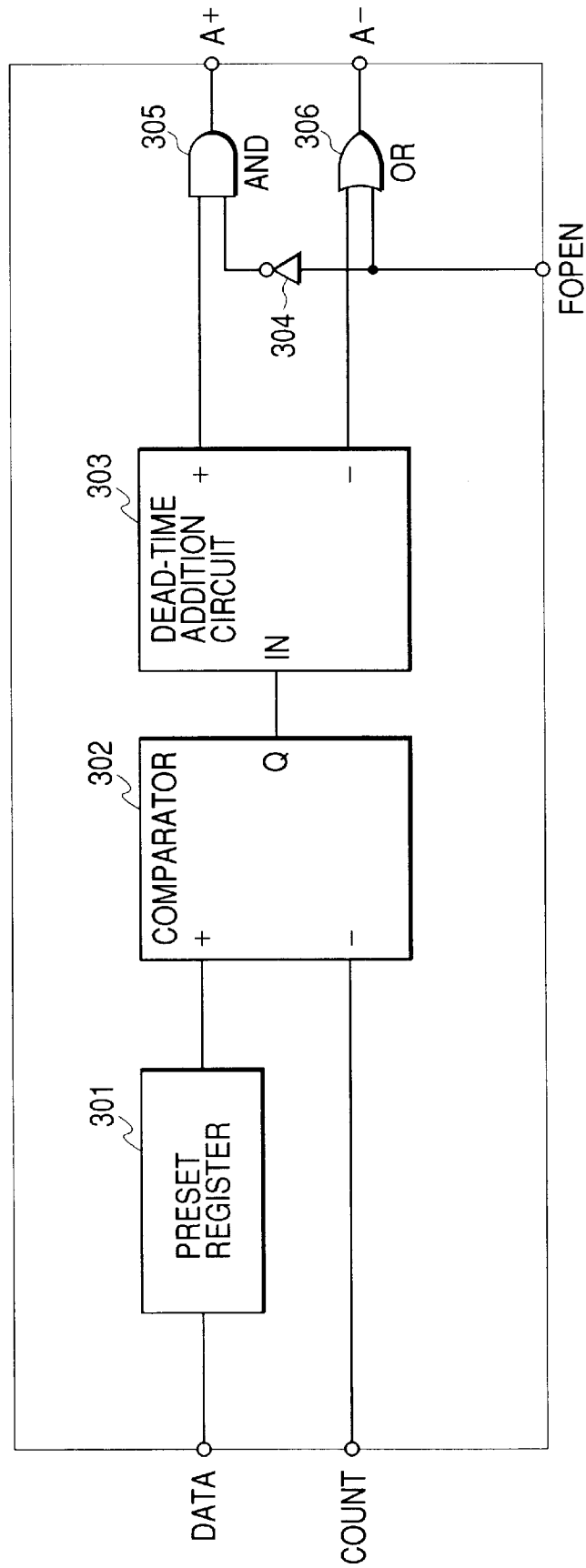
FIG. 3 is a block diagram which shows a pulse generating device.

FIG. 3 is a block diagram which shows the pulse generator. Here, a reference numeral 301 designates a preset register for storing data and outputting the data thus stored; 302, a comparator for comparing two input data; 303, a dead-time addition circuit; 304, an inverter gate; 305, an AND gate; and 306, an OR gate.

Figure 4:
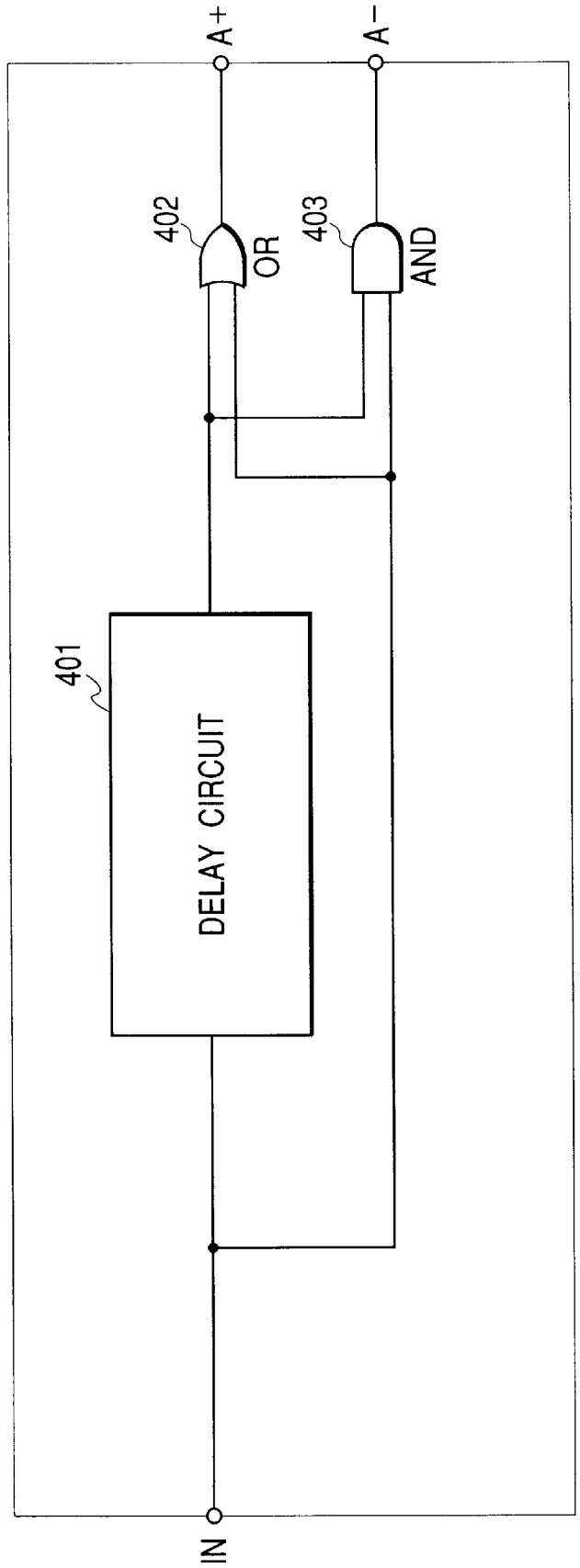
FIG. 4 is a block diagram which shows a dead-time addition circuit.

FIG. 4 is a block diagram which shows the dead-time addition circuit 303. A reference numeral 401 designates a delay circuit for delaying a signal by a specific period of time; 402, an OR gate; and 403, an AND gate.

Figure 5:
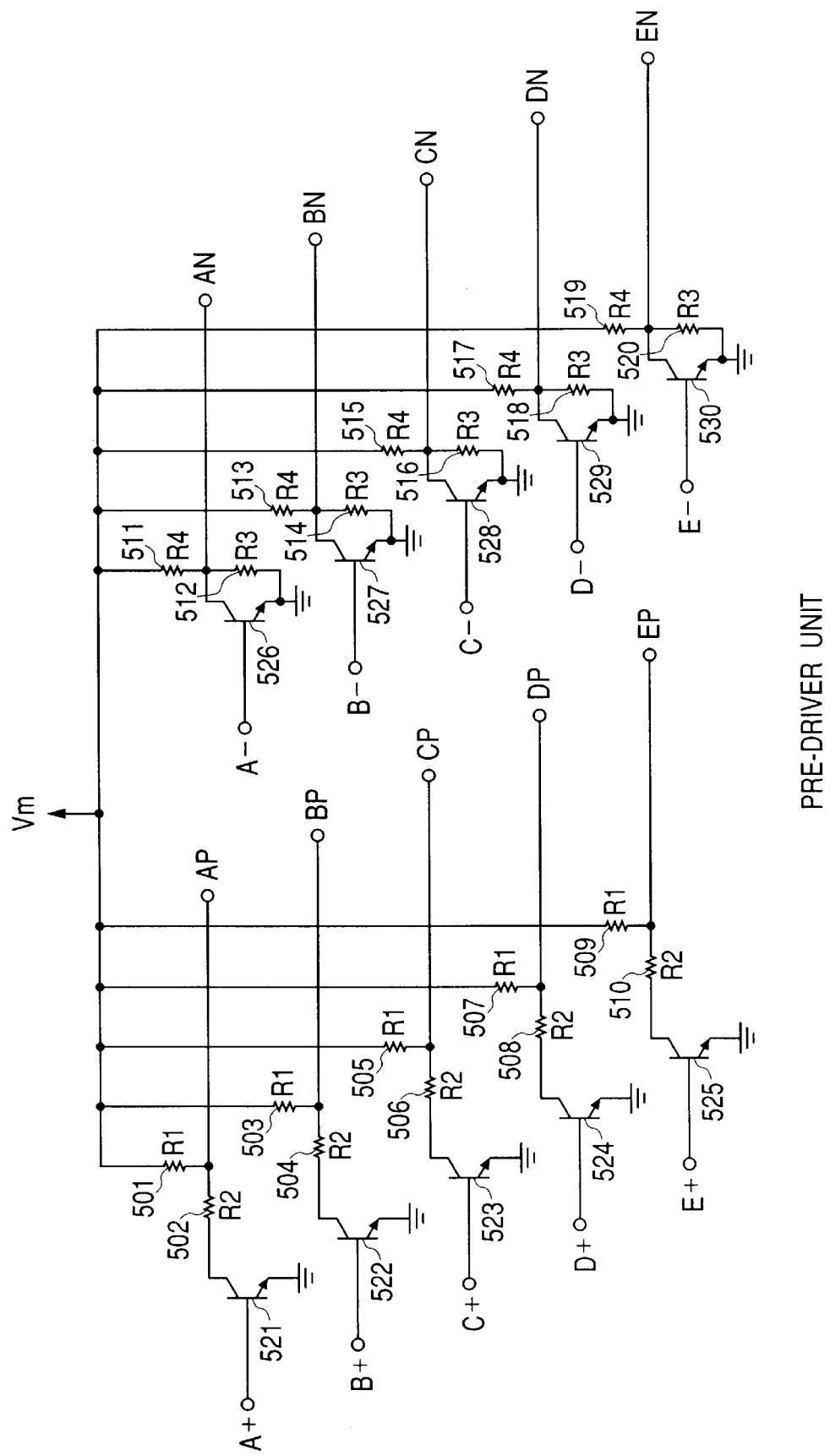
FIG. 5 is a diagram which shows a pre-driver circuit.

FIG. 5 is a circuit diagram of the pre-driver unit 3. Reference numerals 501 to 520 designate resistors, and 521 to 530, NPN transistors. Here, each of reference marks A+ to E+ is converted to the level of Vm*R2/(R1+R2) when the transistors 521 to 525 are turned on, and converted to the level of Vm when they are turned off; A− to E−, converted to the level 0 when the transistors 526 to 530 are turned on, and converted to the level of Vm*R4/(R3+R4) when they are turned off, so as to secure the gate voltage at the FET of the driver unit 4.

Figure 6:
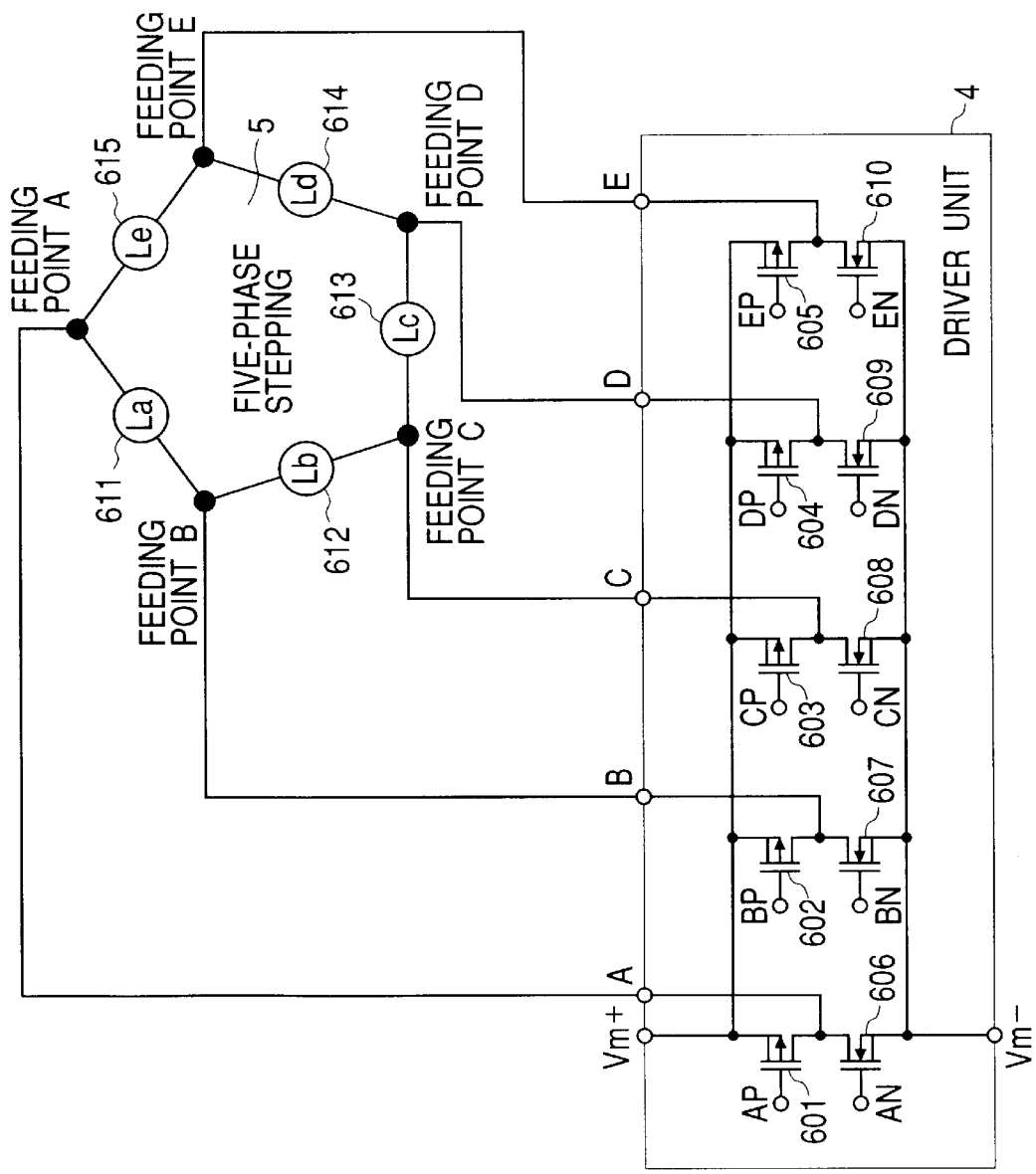
FIG. 6 is a diagram which shows an inner circuit of a driving unit and the inner structure of a motor, as well as the wiring thereof.

FIG. 6 is a view which shows the inner circuit of the driver unit 4 and the inner structure of the motor 5, as well as the wiring thereof. Here, reference numeral 601 to 605 designate the PchFET devices; 606 to 610, the NchFET devices; and 611 to 615, coils of each phase which correspond to the La to Le, respectively.

Figure 7:
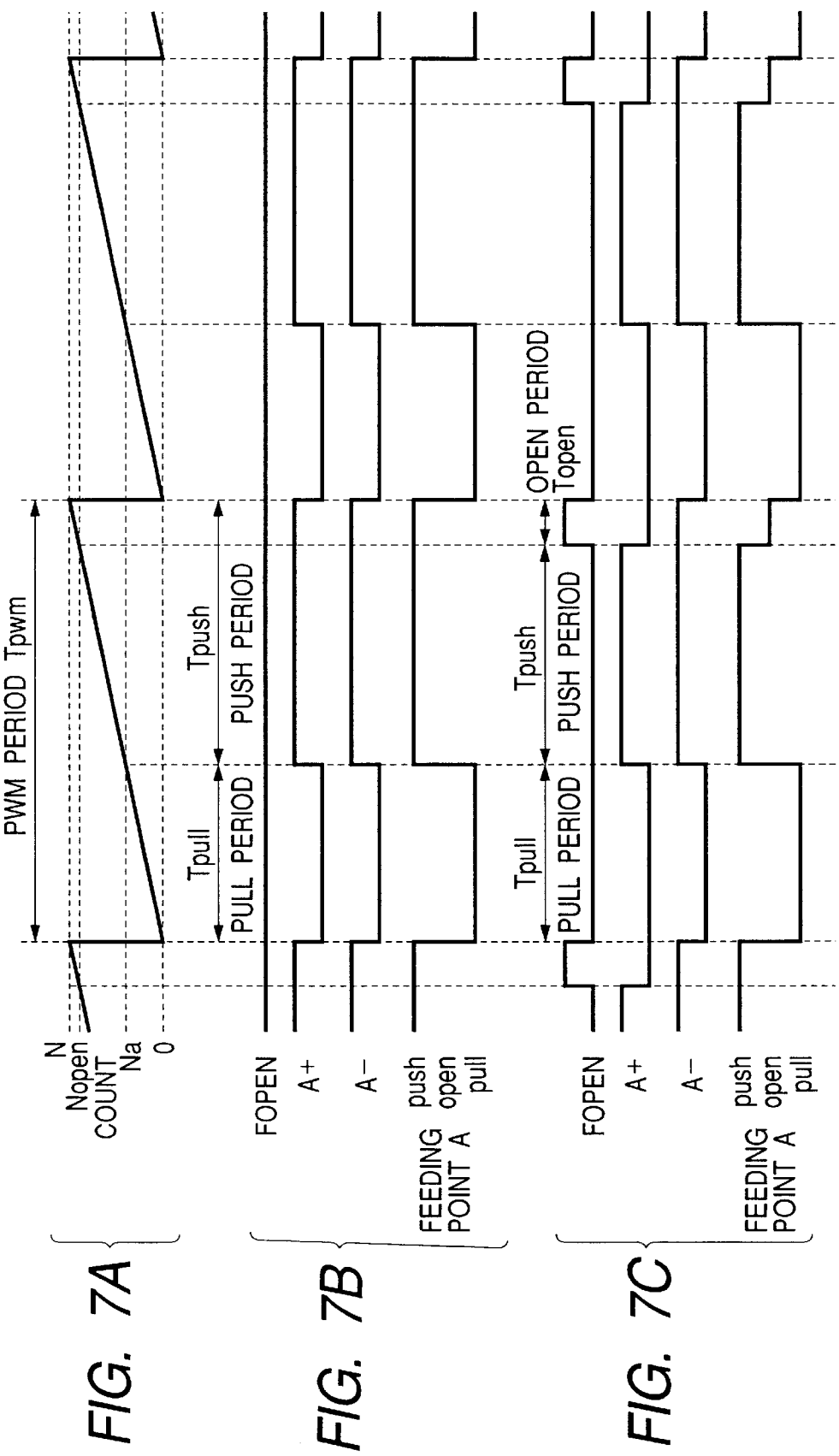
FIG. 7A is a time chart which represents an output of a counter.
FIGS. 7B and 7C are time charts which represent driving pulses and the status of feeding points.

FIGS. 7A to 7C are time charts for indicating the driving pulses which are generated in accordance with the counting information of the counter 202 shown in FIG. 2, and the status of one feeding point of the motor 5 on the basis thereof.

Figure 8:
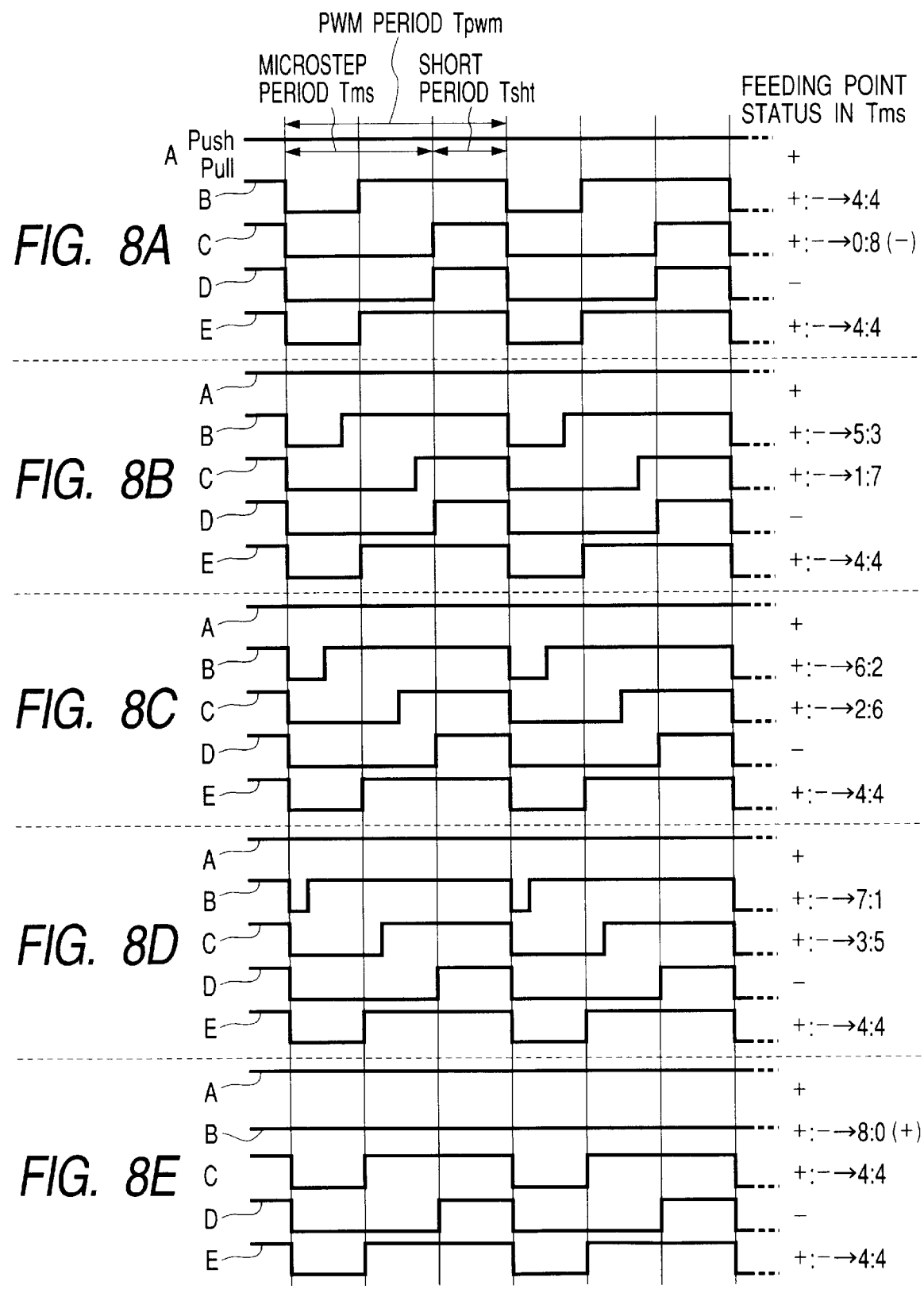
FIGS. 8A, 8B, 8C, 8D and 8E are time charts which represent a microstep operation by the status of feeding points.

FIG. 8 is a time chart for indicating the state of microstep being effectuated by means of driving pulse in terms of the status of each feeding point of the motor 5.

FIGS. 9A to 9E are views which show the current flowing in respective coils of the motor 5 depending on the feeding point status represented in FIG. 8.

Now, the operation will be described.

In FIG. 1, when the input of MCLK is received by the MCLK terminal 9, following reception of the starting instruction by the S/S input terminal 10, the motor driving pulses are generated, based on conditions of the CW/CCW, DIV, and CUR, in synchronism with the MCLK, thus the motor 5 being rotated. The controller 1 transmits to the logic unit 2 the CLK which becomes clock for the counters or the like in order to generate driving pulses; the STOP that instructs the generation or suspension of driving pulses; and the DATA that transmits the data required for generating pulses.

In FIG. 2, the CLK from the controller 1 is inputted into the counter 201 in which it is counted up, and thus counted information is output as the COUNT. In the preset register 202, the count data N form the controller 1 is latched, and the data thus latched are output. Then, in the comparator 203, the data from the preset register 202 and the COUNT are compared. If these data are in agreement, an identical signal is output. This identical signal is inputted into the counter 201. With this signal, the counter 201 resets the counted value, and begins counting again from 0. In other words, the counter 201 repeats such an operation as to count up again from 0 to N, like the COUNT shown in FIG. 7A, when the COUNT becomes N from 0 on the basis of the CLK. Now that the period of the CLK is constant, the time required for counting up from 0 to N depends on the N. This period is defined as the Tpwm.

In accordance with the COUNT information, each of the pulse generating devices 207 to 211 generates driving pulses to drive the motor 5. Here, the preset register 202 in the logic unit 2 is assumed to be REGPWM, and the preset register 204, REGOPEN, and the preset registers 301 in the pulse generating device are assumed to be the REGA, REGB, REGC, REGD, and REGE of the pulse generators 207 to 211, respectively. Now, with the pulse generator 207 as an example, the description will be made of the flow of pulse generation as follows. In FIG. 3, the data Na from the controller 1 is latched in the REGA (preset register 301), and compared with the aforesaid COUNT in the comparator 302. Then, the result of the comparison is output to the dead-time addition circuit 303. The dead-time addition circuit 303 produces two signals for determining the status of feeding point so as to drive the motor 5 not to penetrate the PchFET and NchFET of the driver unit 4 simultaneously. These two signals pass the AND gate 305 and OR gate 306 following the signal of the FOPEN in that order to be output as A+ and A−, and after the level conversion is executed by the predriver 3, these signals are supplied to the driver unit 4. Then, the driver unit 4 determines the status of feeding point.

In the dead-time addition circuit 303 shown in FIG. 4, a delayed signal derived from the delay circuit 401 where an input signal is delayed by a specific time and a non-delayed signal(the input signal) are ANDed and ORed, and are output as the PchFET and NchFET driving pulses, respectively, thus the structure being formed to prevent the penetration of Pch and NchFET owing to the SW characteristics. Here, while this dead-time is not directly related to the present invention, it is sufficiently smaller than the other pulse period. Hereunder, therefore, the dead-time will be neglected in the description to follow.

When the FOPEN is at low level, the A+ and A− become as shown in FIG. 7B by the comparison between the REGA value (Na) of the preset register 301 and the COUNT by means of the comparator 302. In other words, until when the COUNT reaches the Na, both the A+ and A− are at the low level, but beyond the Na, these are at high level. This is repeated in the Tpwm period to generate dividing pulses. The status of feeding point at this juncture becomes as shown in FIG. 7B. That is, the status repeats the period up to Na during which current is pulled (the period of pull status, Tpull) and the period beyond Na during which current flows in from the power source (the period of push status, Tpush).

The FOPEN is the signal that enables the status of feeding point to be open. In other words, when the data Nopen is latched in the preset register 204 (REGOPEN) shown in FIG. 2, the comparator 205 compares such data with the COUNT to output the low level until the COUNT reaches the Nopen and output the high level beyond the Nopen, as shown in FIG. 7C. Such signal enters the AND gate 206 along with the STOP, and an output from the AND gate is transmitted to each of the pulse generators as the FOPEN. The STOP becomes low level when the motor 5 rotates. When the FOPEN is at the high level, all the feeding points are in open status only during the high level period as shown in FIG. 7C. Also, when the STOP is made high level, the FOPEN becomes high level, and all the feeding points are in open status so as not to allow current to flow into the motor 5. Thus, the motor 5 comes to a stop.

Now, the operation will be described. With the PWM, the driving current flows into the motor 5, and this period is divided into a microstep period during which the ratio of current to flow into the coil of motor 5 at each phase is determined, and a short period during which the current distributed to each phase is held. The motor 5 is thus driven accordingly. The PWM period is referenced by a mark Tpwm; the microstep period, by a mark Tms; and the short period, a mark Tsht. Now, to observe one cycle of the PWM at the feeding point in FIG. 8B, the feeding point A in the microstep period Tms indicates the push status (+), and the feeding pint D indicates the pull status (−). Then, current flows from the feeding point A to B through the coil La during the period when the feeding points B and C indicate − and −, and current flows from the feeding point B to C through the coil Lb during the period of + and −. Then, during the period of + and +, current flows from the feeding point C to D through the coil Lc. Thus, when each of the feeding points is in the same status as that of the adjacent one, both ends of each coil is turned on to the Vm side by the FET to be short-circuited, and the current flowing in the coil is held.

In this way, the ratio of the amounts of current flowing in the coils La, Lb, and Lc is determined by the pull/push periods at the feeding points B and C. Likewise, the amounts of current flowing in the Ld and Le are determined by the ratio by the pull/push at the feeding point D. Further, during the short period Tsht, all the feeding points are, on the push side, that is, in the status of being turned on to the Vm side by the FET device. Therefore, both ends of each coil are short-circuited to hold current flowing in each coil during this period. Consequently, during the microstep period Tms, the amount of current flowing in each coil is determined, and during the short period Tsht, the current that flows in the entire of the motor is determined.

Next, exemplifying the four-division microstep operation, the description will be made of the microstep.

Figure 9:
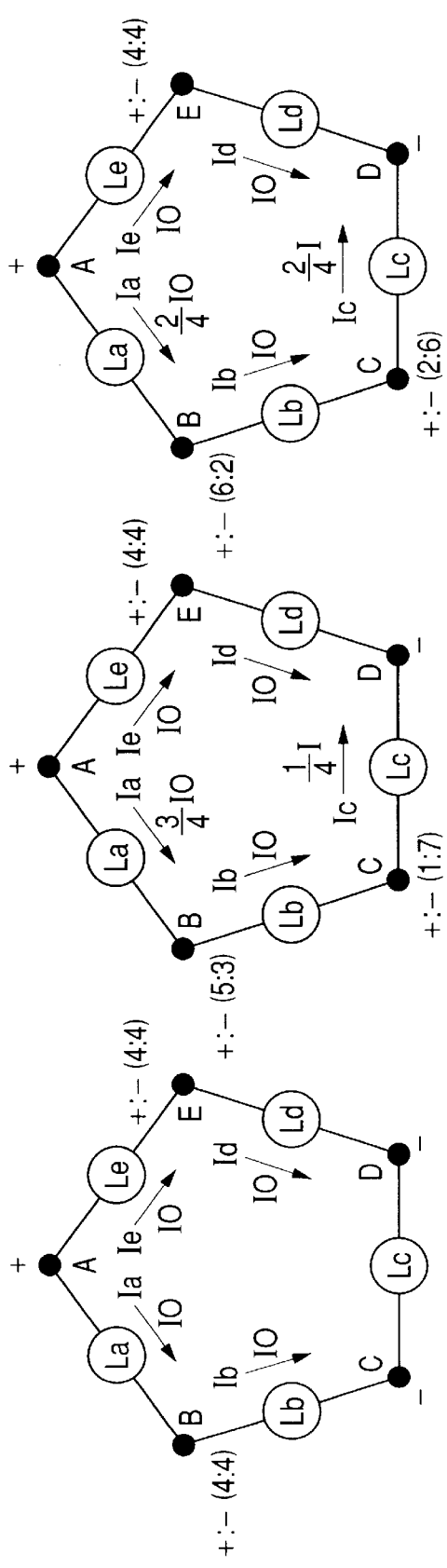
FIGS. 9A, 9B, 9C, 9D and 9E are views which represent currents running on respective coils of a motor.

When the status of each feeding point is changed in FIGS. 8A to 8E at the time of the MCLK rising, the current flowing in each coil is caused to change as shown at FIGS. 9A to 9E. Here, with the short period being made constant, the adjacent feeding points of each coil indicate the status of + on one end, and − on the other when current flowing in each of the coils at the maximum value. At this juncture, the ratio of pull and push in the microstep period becomes 1:1. Then, the current at that time is defined as I0. In FIG. 8B (FIG. 9B) and FIG. 8E (FIG. 9E), the status is in the four-phase excitation, and when the status of each coil is changed from FIG. 8A (FIG. 9A) to FIG. 8E (FIG. 9E) directly, it becomes possible to effectuate one step rotation by means of full step driving. The microstep is such that one step by this full step driving is further divided by minutely controlling the ratio of current that flows into each of the coils so as to change the status of each feeding point as shown in FIGS. 8B to 8D, thus changing the current that flows in each coil as shown in FIGS. 9B to 9D. Following this change, the motor 5 rotates from the position in FIG. 8A (FIG. 9A) by four angles each formed by dividing one step into four, for each rising of the MCLK, so the motor can be shifted to the four-phase excitation in FIG. 8E (FIG. 9E). In this manner, it becomes possible to rotate the motor 5 in a desired number of divisions in synchronism with the MCLK by changing the status of each feeding point so as to enable the motor 5 to rotate per MCLK.

Next, the description will be made of the control of microstep.

Figure 10:
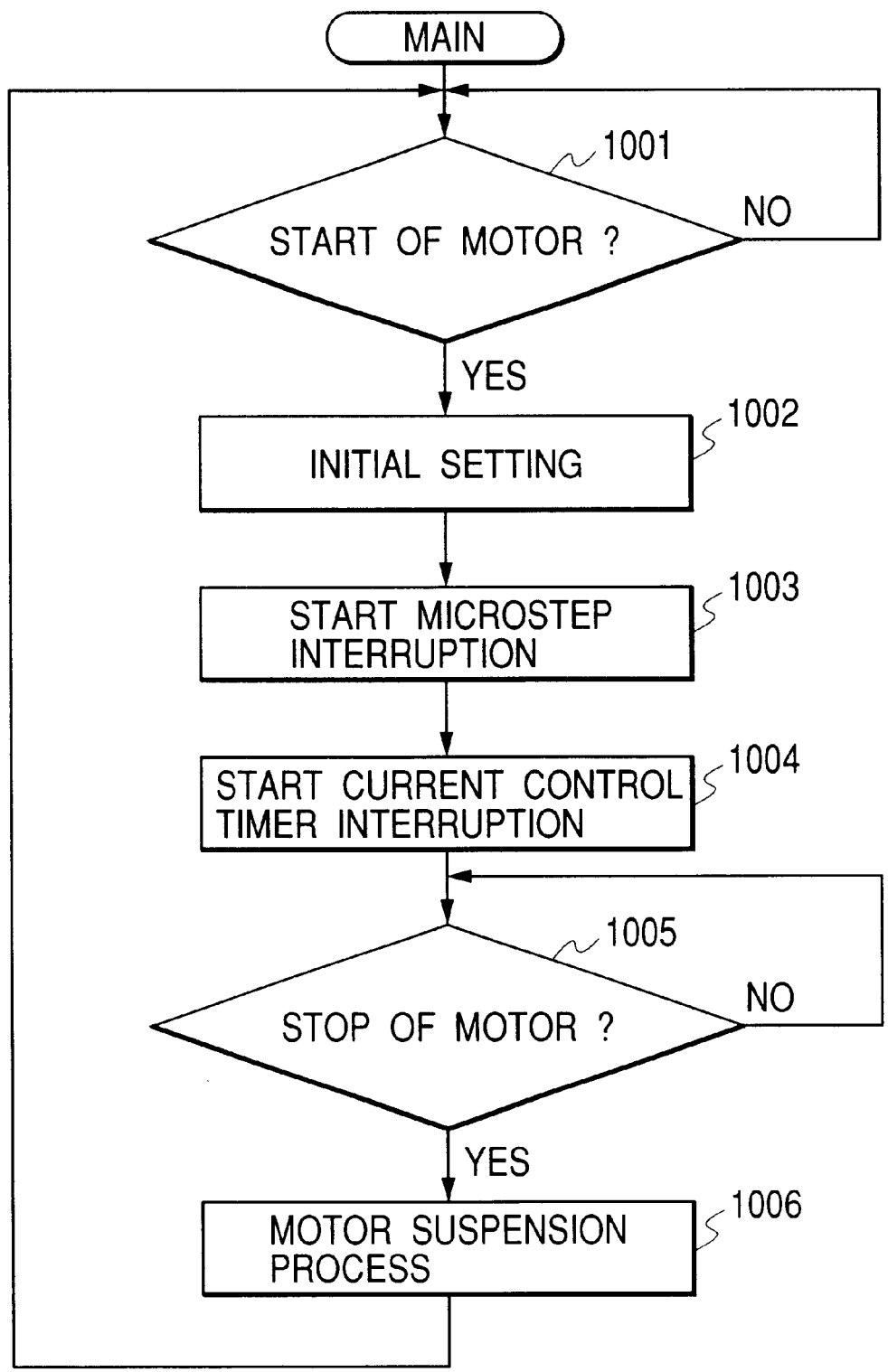
FIG. 10 is a flowchart which shows the main control performed by a control unit.

FIG. 10 is a flowchart which shows the main control program stored on the memory of a microcomputer in the controller 1 to control the motor 5. When the controller 1 receives the S/S signal that instructs the start of the motor 5 (1001), there is initialized the motor driving status or the like, which is needed for driving the motor (1002) regarding each of the feeding points. Then, the microstep interruption is admitted (1003), and the current control timer interruption is admitted as well (1004). After that, until when the S/S signal instructs the suspension of the motor 5 (1005), the motor 5 is kept in the driving status. When the suspension is instructed, each of the feeding points is turned into suspended status, thus executing the suspension process such as the prohibition of each interruption (1006). Then, the status is brought to the motor start standby (1001).

Figure 11:
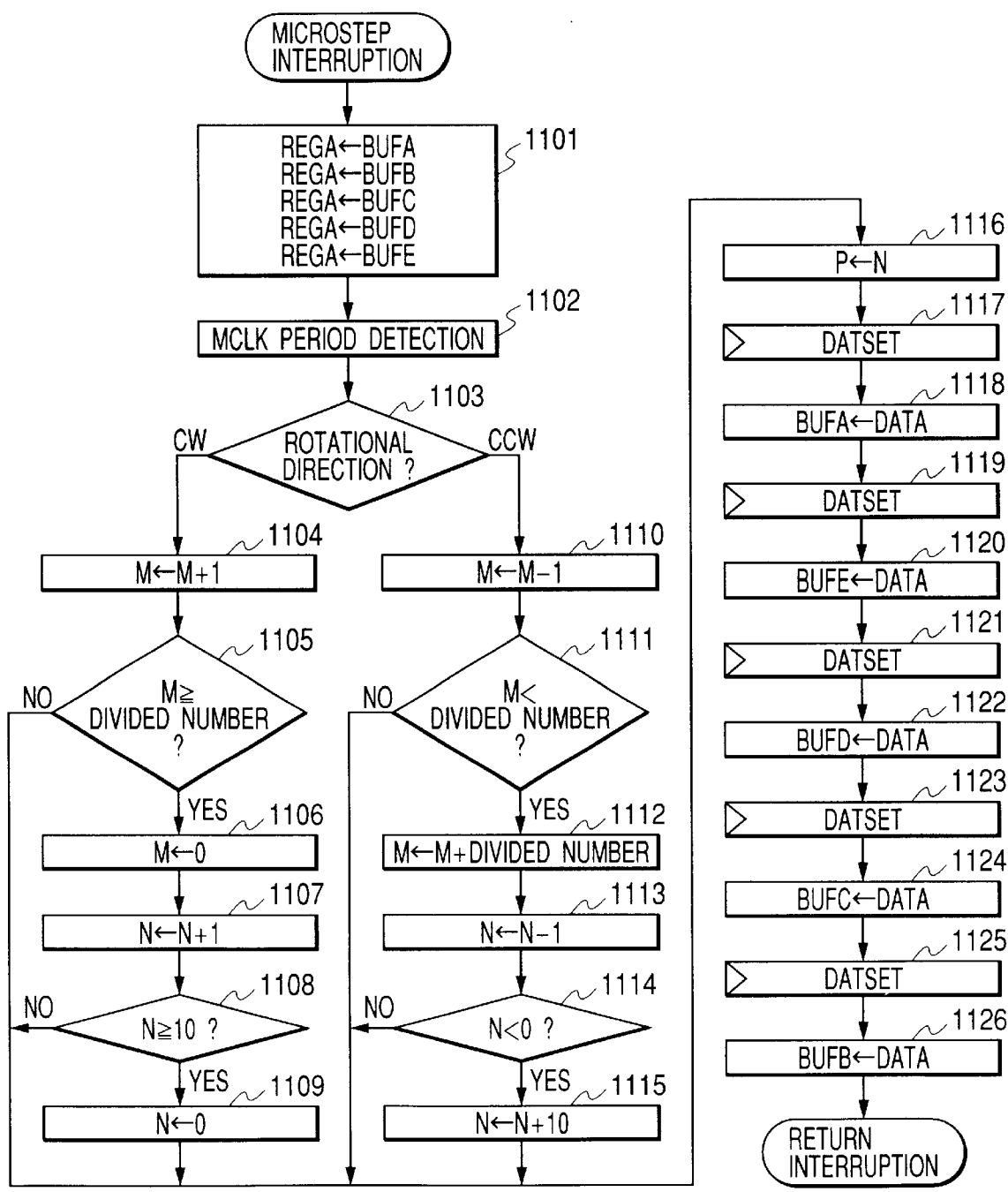
FIG. 11 is a flowchart which shows the microstep interruption.

FIG. 11 is a flowchart which shows the program of microstep interruption stored on the memory of the microcomputer of the controller 1, which enables the interruption to be admitted immediately when the MCLK rises. With the interruption thus effectuated, the data BUFA to BUFE are set at each of the registers REGA to REGE in each of the pulse generators 207 to 211 (1101) to generate driving pulses. At this juncture, the data that enables the setting of a period larger than the Tpwm is latched in the preset register 204. As a result, the FOPEN is kept always in the low level status so as not to allow the open period to be created.

Then, a period of the MCLK is detected (1102). The instruction by the CW/CCW as to the rotational direction is examined (1103). If the instructed rotation is the CW, an M (divided position) is incremented (1104). If the M exceeds the divided number instructed by the DIV (1105), the M is reset to 0 (1006) and an N (step number) is incremented (1107). If the N exceeds 10 (1108), the N is reset to 0 (1109). If the instructed rotation is the CCW, the M is decremented (1110), and when the M is made lower than the divided number (1111), the divided number −1 is set to the M (1112), and the N is decremented (1113). If the N is minus (1114), 9 is set to the N (1115). Next, the N is set at a P (1116), and the subroutine DATSET is called to calculate the data needed for setting the excitation pattern at the time of next rising of the MCLK, thus returning it as DATA. Thus, after setting each result of the calculations to the REGA, REGB, REGC, REGD, and REGE, respectively, the process returns from the interruption (1117 to 1126).

The Table 1 shows each status of feeding points during the microstep period of 10-step portion (electrical angle 3,600) at the full step. In the Table 1, the sign + designates the pull status, and the sign −. "50%" at the table represents the status where the ratio of the push period the pull period is 1:1. As shown in the Table 1, if the excitation pattern is changed as the N=0 to 9 according to the MCLK, the motor 5 indicates the full step driving and rotates in the CW direction. At this juncture, given the feeding point A as F(N) where the N is a step number, each of the feeding points become as follows:

Feeding point
A: F(N)
B: F(N−8)
C: F(N−6)
D: F(N−4)
E: F(N−5)

Figure 12:
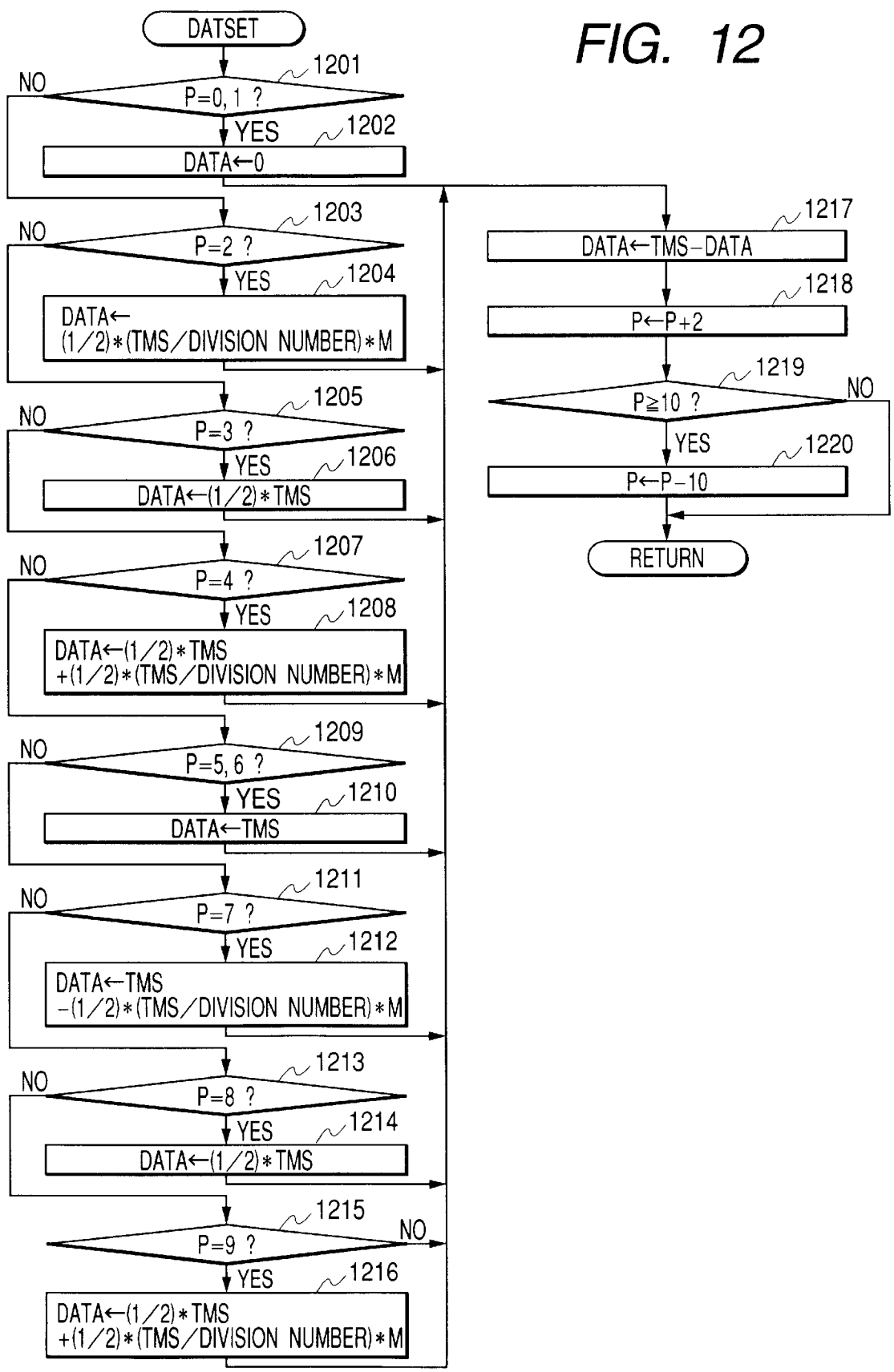
FIG. 12 is a flowchart which shows the driving pulse calculation.

Also, for the microstep, at the feeding point A, the ratio of the push and pull periods is changed at the section where the N is shifted to 2 to 3, 4 to 5, 7 to 8, and 9 to 0, and the rotational direction is assumed to be the CW. Also, given the divided position between steps as M (M=0, 1, . . . , divided number−1), and the data TMS on the preset register 202 for setting the microstep period Tms, each status of feeding points at N value can be expressed as follows:

when N=0, 1, . . . (pull status),
when N=2, . . . (½)*(TMS/divided number)*M
when N=3, . . . (½)*TMS
when N=4, . . . (½)*TMS+(½)* (TMS/divided number)*M
when N=5 and 6, . . . +(push status)
when N=7, . . . (TMS−(½)* (TMS/divided number)*M
when N=8, . . . (½)*TMS
when N=9, . . . (½)*TMS−(½)* (TMS/divided number)*M Thus, the driving pluses are generated at the feeding point A for the microstep. The DATSET shown in FIG. 11 is a subroutine based thereon to calculate the driving pulses for each of the feeding points. FIG. 12 is a flowchart which shows this subroutine program.

Each of the data BUFA to BUFE on the status of feeding points calculated in FIG. 12 is set at the REGA to REGE, respectively, when the MCLK rises. This process is repeated to switch the excitation patters based on the divided number per MCLK in order to drive the motor 5, hence making it possible to execute the microstep.

TABLE 1

| N | 0 | 1 | 2 | 3 | 4 | 5 | 6 | 7 | 8 | 9 |
|---|---|---|---|---|---|---|---|---|---|---|
| feeding point A | − | − | − | 50% | 50% | + | + | + | 50% | 50% |
| feeding point B | 50% | 50% | − | − | − | 50% | 50% | + | + | + |
| feeding point C | + | + | 50% | 50% | − | − | − | 50% | 50% | + |
| feeding point D | − | 50% | 50% | + | + | + | 50% | 50% | − | − |
| feeding point E | 50% | + | + | + | 50% | 50% | − | − | − | 50% |

Now, the description will be made of the current control.

Figure 16:
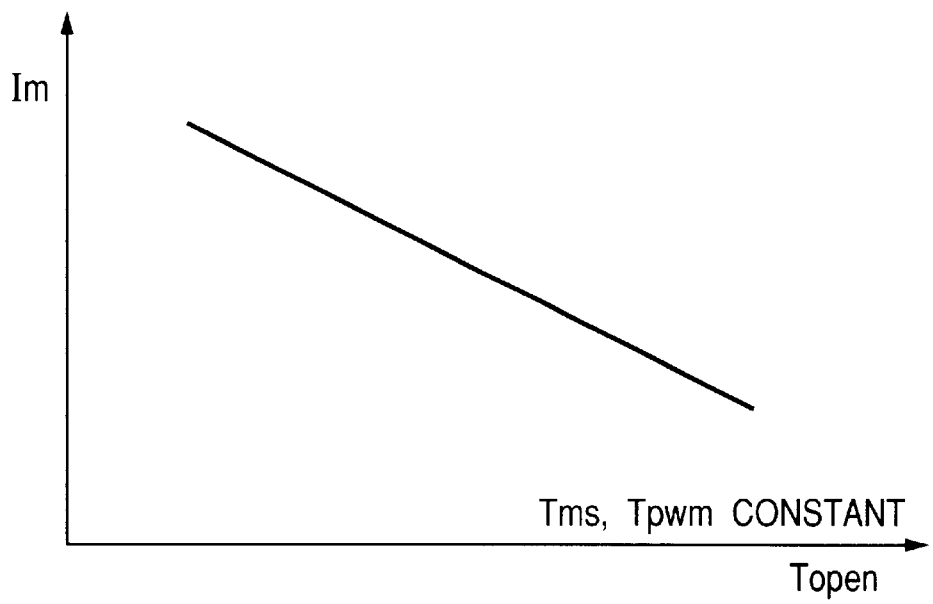
FIG. 16 is a view which shows the characteristic of Topen-Im in the current control of the present invention.

FIG. 16 is a graph which shows the motor current Im when the width of the open period is changed while keeping the Tpwm, the Tms, and the motor rotational speed constant. As shown in FIG. 16, with the open period being increased, the Im is gradually reduced. This is because when each of the feeding points is in the open status, the counter-electromotive voltage which is generated in the motor causes the motor current to flow reversely through the diode inside the FET device, and the torque is also reduced to that extent. Therefore, it is necessary to make the Tpwm cycle smaller in order to generate the same torque (current).

Figure 13:
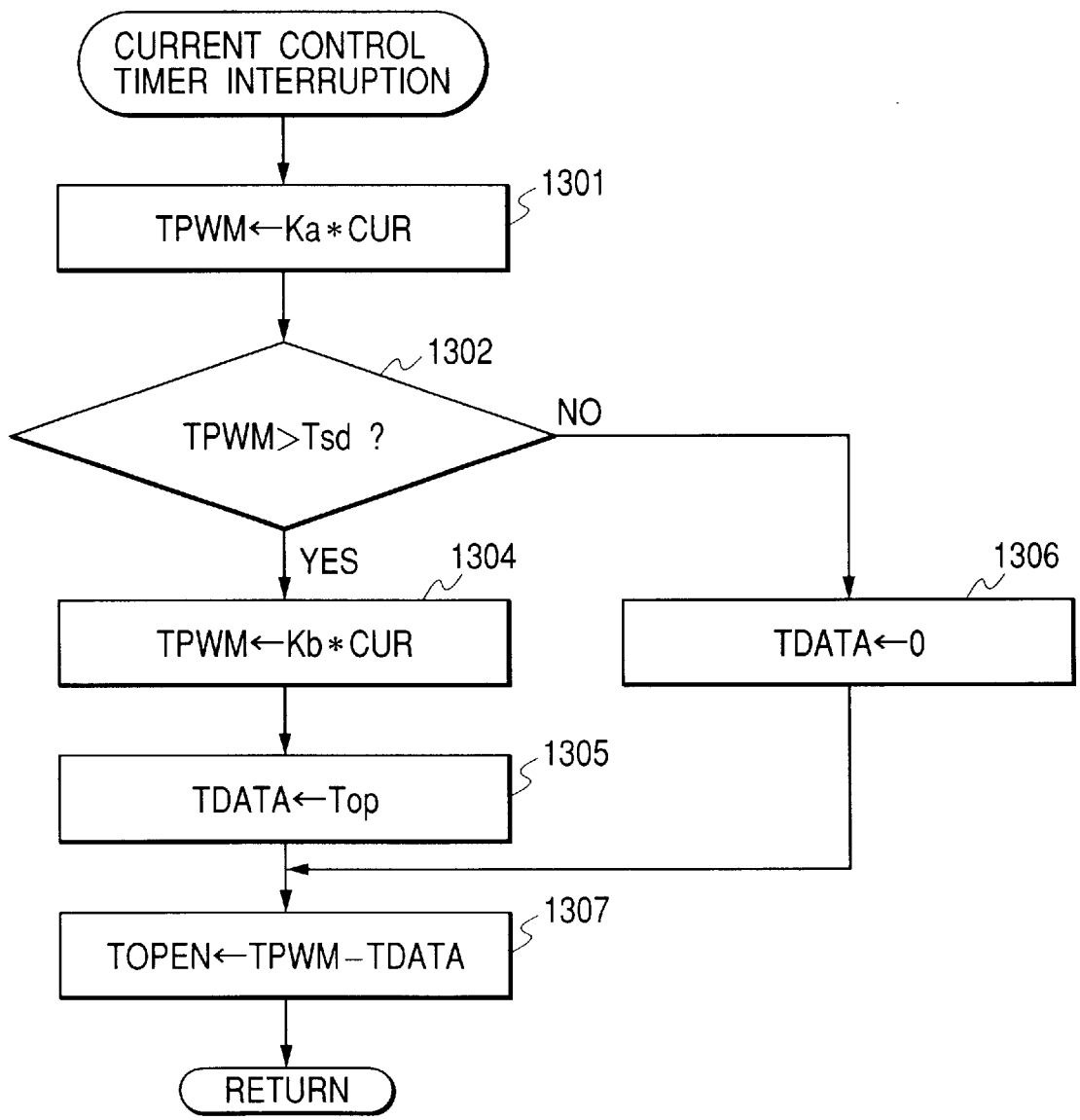
FIG. 13 is a flowchart which shows the current control timer interruption in accordance with a first embodiment.

FIG. 13 is a flowchart which shows the program of the current control timer interruption. The timer interruption is an interruption effectuated per specific period, and the cycle thereof is sufficiently larger than the Tpwm. When the interruption is effectuated, the current setting value which has been set at the current indication CUR is multiplied by Ka (1301), thus being set as a TPWM, which is compared with Tsd (1302). The Tsd is a period corresponding to the minimum frequency Fsd in the non-audible range. The TPWM is the data which is set at the preset register 202 in order to create the Tpwm period. If the TPWM is less than the Tsd, no abnormal sound is generated.

If the TPWM is larger than the Tsd after the comparison, the TPWM is modified to be a value which is obtained by multiplying the CUR by the Kb (1305). Next, a predetermined open period Top is set as a TDATA (1306). Then, the value obtained by subtracting the TDAT from the TPWM is set at the preset register 204 which determines the Topen period (1307), thus returning from the interruption. On the other hand, if the TPWM is smaller than the Tsd, 0 is set at the TDATA (1304), and the TPWM which has been set in the step 1301 is set as a TOPEN. Here, the TPWM being equal to the TOPEN means that the open period is not allowed to be created.

Figure 18:
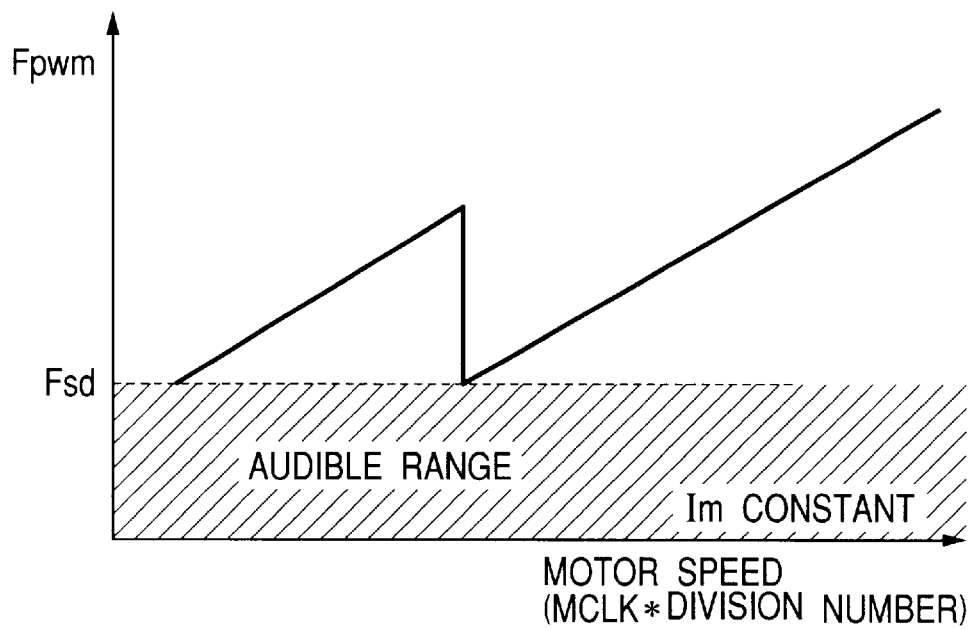
FIG. 18 is a view which shows the characteristic of motor speed-Fpwm.

With the motor speed being changed by the aforesaid control, the status becomes as shown in FIG. 18 if the CUR value is set to make the current Im equal. In FIG. 18, the axis of abscissa indicates the motor speed, and the axis of ordinate indicates the PWM frequency Fpwm. When the motor speed is slowed down and the Fpwm is fell to Fsd as shown in FIG. 18, the Tpwm needs to be made larger if it is intended to enable the same current to flow, because the open period is added. In this manner, if the CUR value is changed to obtain an adequate current at a different speed, it becomes possible to prevent any abnormal sound from the motor 5, while providing the motor 5 with an adequate torque.

(Second Embodiment)

Figure 14:
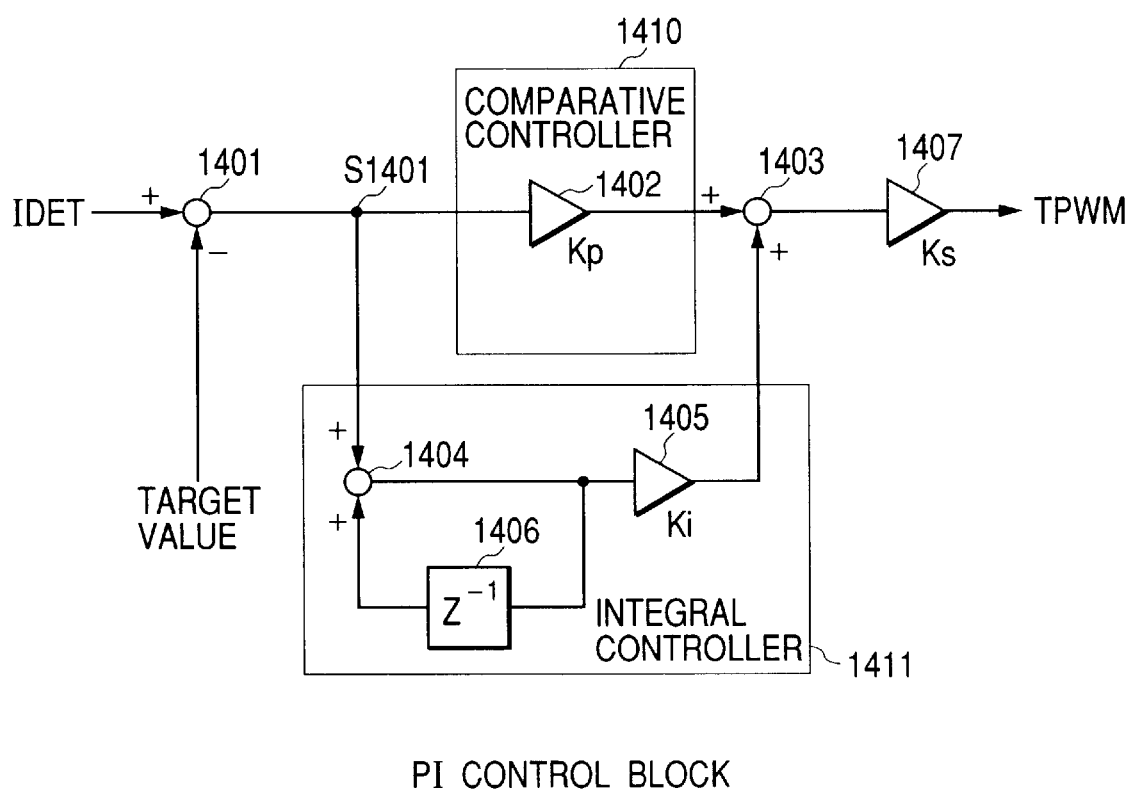
FIG. 14 is a block diagram which shows the PI control block in accordance with a second embodiment.

A second embodiment will be described in accordance with the present invention. FIG. 14 is a view which shows a PI control block that executes the constant-current control with the feedback of the motor current. Here, reference numerals 1401, 1403, and 1404 designate adders; 1402, 1405, and 1407, multipliers; 1406, a delay device. The constant-current control reads as IDET the data which has been detected by the current detection resistance Rd6 shown in FIG. 1 and A/D converted in the controller 1. In FIG. 14, using the adder 1401 in the control block the IDET is compared with a target value TARGET set on the basis of the data from the current indication value CUR, and the result thereof becomes the signal S1401. The S1401 is multiplied by the comparative gain Kp using the multiplier 1402 of the comparative controller 1410. Also, the S1401 is integrated by use of the adder 1404 of the integral controller 1411, and, further, multiplied by the integral gain Ki by use of the multiplier 1405. The respective outputs from the comparative controller 1410 and the integral controller 1411 are added by use of the adder 1403, and the result thereof is multiplied by the coefficient Ks, which has been selected to be the set current of the current indication CUR, by use of the multiplier 1407, and set at the preset register 202 as the TPWM. In this manner, the constant-current control is executed.

Figure 15:
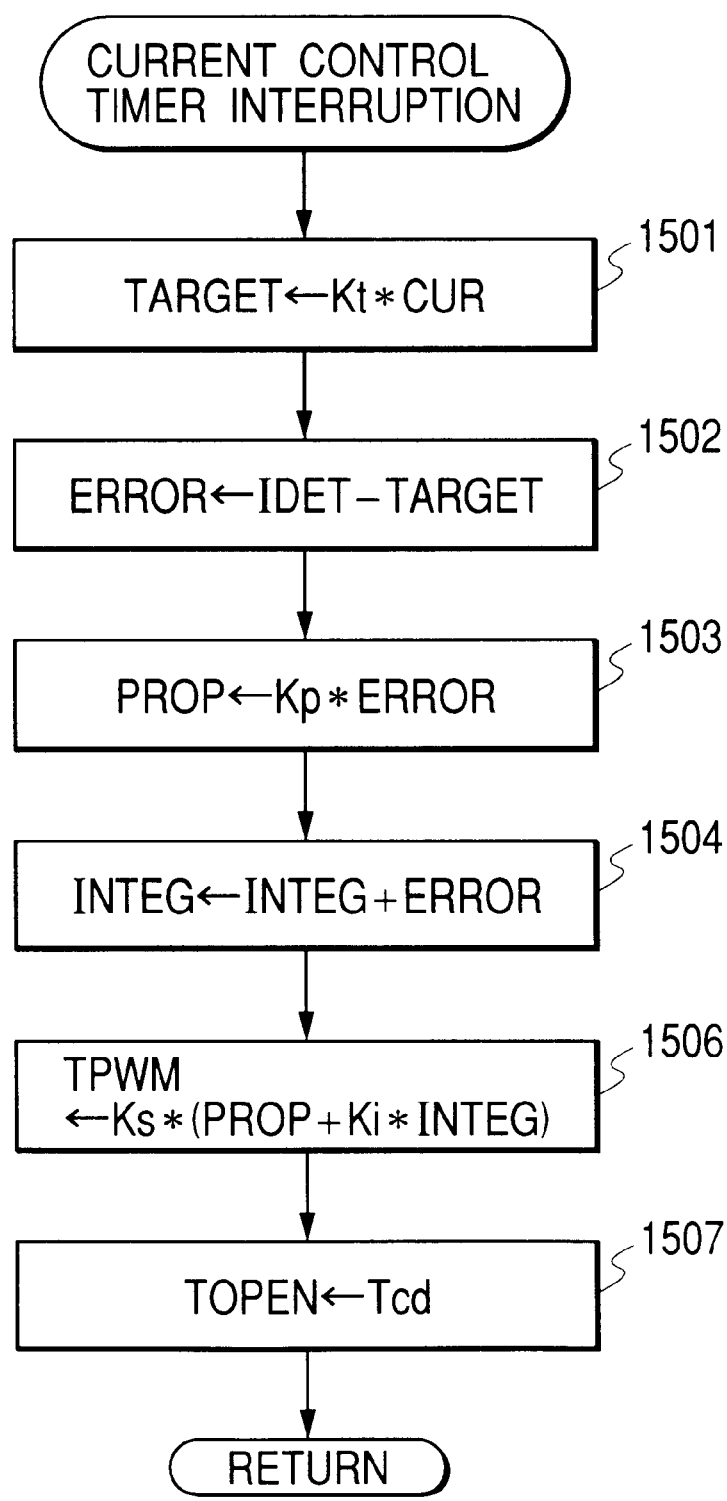
FIG. 15 is a flowchart which shows the current control timer interruption in accordance with the second embodiment.

FIG. 15 is a flowchart which shows a program of current control timer interruption used when the microstep period Tms of the aforesaid constant-current control is made constant. Here, when the interruption is issued, the data obtained by multiplying the set value of the current indication CUR by a Kt is set at the current target value TARGET (1501). Here, the Kt is a coefficient which has been selected to control speed by the set current CUR. Then, the IDET and the TARGET are compared, and the result thereof is set as an ERROR (1502), and the ERROR is multiplied by the Kp to be set as a PROP (1503). Also, the ERROR is integrated to be set as an INTEG, and then, the value which is obtained by multiplying the INTEG by the Ki, and the PROP are added and the sum is multiplied by the Ks, thus being set at the TPWM (1504, 1505, and 1506). Next, a Tcd is set at the TOPEN (1507), and the process returns from the interruption.

Figure 19:
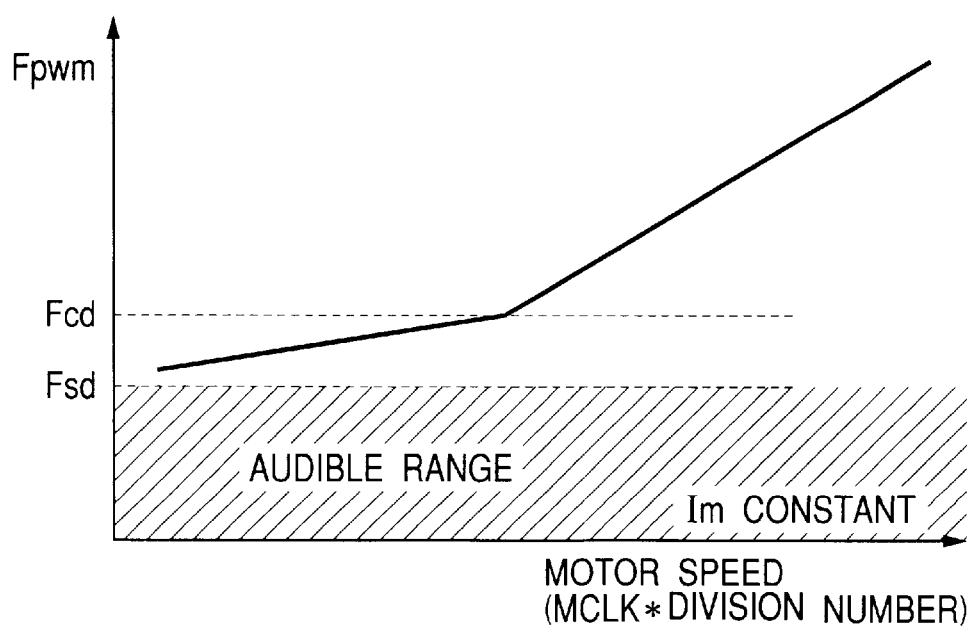
FIG. 19 is a view which shows the characteristic of motor speed-Fpwm.

Here, if the Tcd is not changed, the TOPEN retains the Tcd at all the time. Then, the open period becomes a period of the TPWM-Tcd, and a Topen, but if the Tcd is larger than the TPWM, the Topen is not created. In this way, the current control is completed. FIG. 19 is a graph which shows the Fpwm when the motor speed is changed with an arbitrary current setting value CUR being determined on condition that the Tcd is defined as an adequate value. In the graph, a frequency of the Tcd is given as an Fcd.

Figure 17:
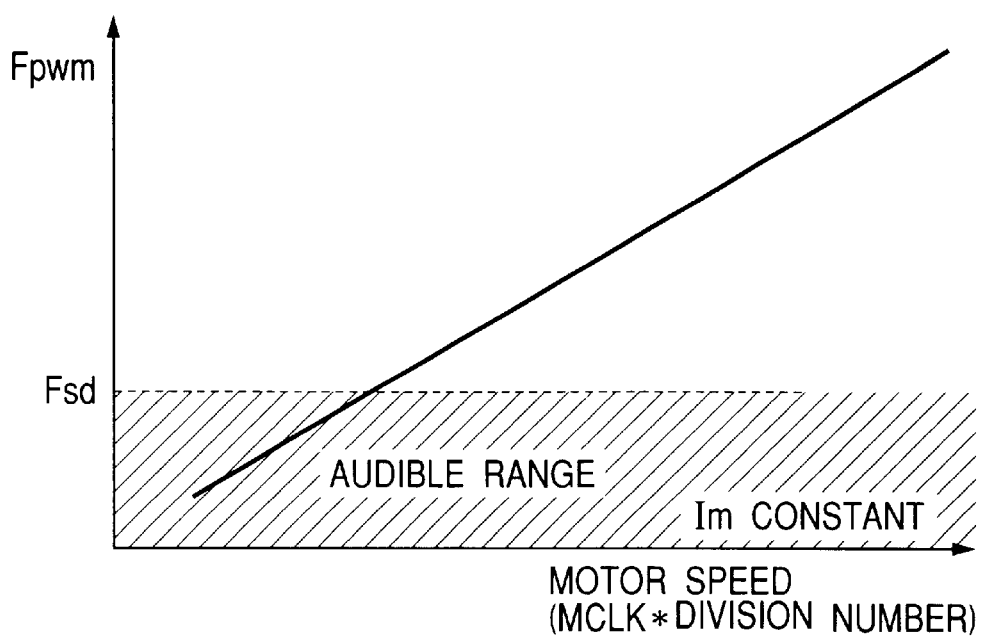
FIG. 17 is a view which shows the characteristic of motor speed-Fpwm in the conventional current control.

For the purpose of comparison, a graph is shown in FIG. 17 which shows the conventional current control in which on the same condition, no routine in the step 1507 is executed. Here, on the other hand, if the Fcd is made smaller than the Fpwm as shown in FIG. 19, the inclination indicated in the graph becomes moderate, and the motor speed which is brought into the audible one can be made smaller. Therefore, if only it should be arranged to set the Tcd value so that the lowest speed of the motor 5 does not enter the audible range, the motor 5 can be driven at an adequate current value without generating any abnormal sound.

(Third Embodiment)

As a third embodiment, it is arranged to execute the current control so that the microstep period is changed until this period becomes the smallest possible microstep Tmsmin in order to execute the control more minutely, and also, to execute the current control by modifying the open period if the microstep period should be made smaller than the Tmsmin.

Figure 20:
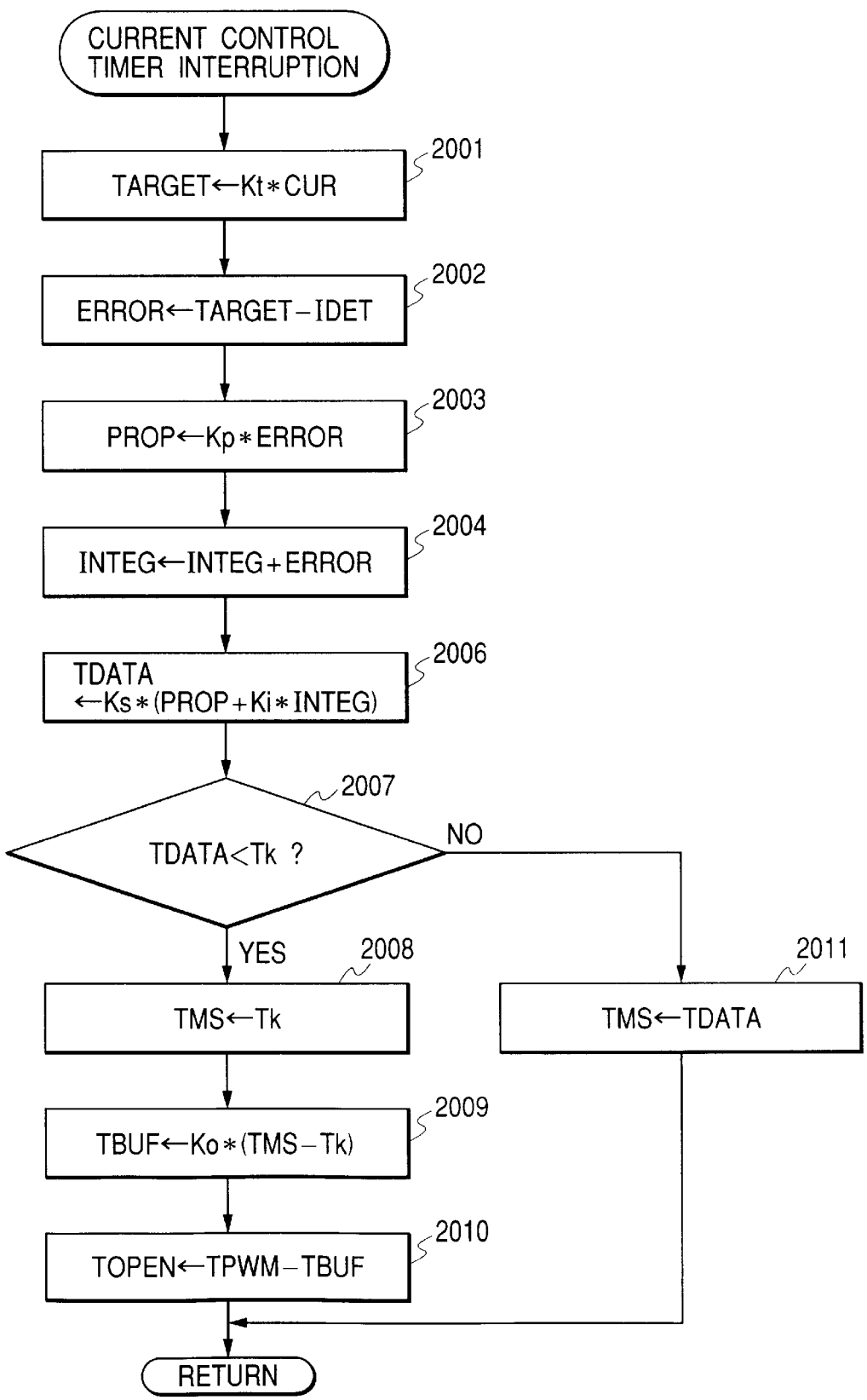
FIG. 20 is a flowchart which shows the current control timer interruption in accordance with a third embodiment.

FIG. 20 is a flowchart which shows the current control timer interruption when the PWM cycle is made constant for the aforesaid constant current control. In this control, when an interruption is issued, the data on the set-up current indication CUR multiplied by a Kt is set at the current target value TARGET (2001). Here, the reference mark Kt is a coefficient which has been selected for controlling the speed by the set-up CUR.

Then, the IDET and the TARGET are compared, and the result thereof is set as an ERROR (2002). The ERROR is multiplied by the Kp to be set as a PROP (2003). The ERROR is integrated to be set as an INTEG which is multiplied by the Ki. The value thus obtained and the PROP are added, and multiplied by the Ks, the result of which is set at the TDATA (2004 and 2006). The TDATA thus obtained is compared with the minimum value Tk of the microstep period (2007). If the TDATA is larger, the TDATA is set at the TMS (2011). Then, the process returns from the interruption. On the other hand, if the TDATA is smaller, the Tk is set at the TMS (2008). Then, the Tk is subtracted from the TDATA. The value thus obtained is multiplied by a Ko and set as a TBUF (2009).

Here, a reference mark Ko is a coefficient which has been selected to make identical the mutual gains between the control with the microstep period being made variable and the control with the open period being made variable. The open period is established by setting at the TOPEN the value which is obtained by subtracting the TBUF from the TPWM. Then, the process returns from the interruption. The operation is repeated per interruption to make it possible to perform the constant current control.

As described above, if the open period is provided within the PWM cycle at the time of low speed, it becomes possible to drive the motor at Tpwm cycle even at an adequate current value without allowing the cycle to be brought into the audible range. Any abnormal sound is generated, either.

Also, with the provision of the microstep period Tms, the holding period for holding current in each coil, and the open period during such holding period, it becomes possible to drive the motor to rotate with an adequate torque (motor current) by executing the current control which controls such open period even when the microstep period Tms is made the smallest.

Although the present invention has been described with reference to the preferred embodiments, the invention is not limited to the structures of these embodiments. It is of course possible to make various modifications and variations within the range of the claims.

What is claimed is:

1. A motor driving control apparatus comprising:
exciting means for supplying current from a power source to a motor coil;
first setting means for setting an exciting period to supply current from the power source to the motor coil by said exciting means;
second setting means for setting a non-exciting period not to supply current from the power source to the motor coil by said exciting means; and
PWM means for repeating alternately the current supply to the motor coil during the exciting period set by said first setting means, and the non-supply of current to the motor coil during the non-exciting period set by said second setting means,
said motor being driven by changing an exciting pattern of said exciting means,
wherein said motor driving control apparatus further comprises
third setting means for setting a short period to enable each of the feeding points of the motor coil to be short-circuited totally during said non-exciting period; and
fourth setting means for setting an open period to enable each of the feeding points of the motor coil to be totally in an open status.

2. A motor driving control apparatus according to claim 1, further comprising:
fifth setting means for setting a PWM period having said exciting period and said non-exciting period combined together;
comparing means for comparing the PWM period set by said fist setting means and a period arbitrarily set; and
changing means for changing the open period of said fourth means in accordance with the result of comparison by said comparing means.

3. A motor driving control apparatus according to claim 2, wherein the exciting period set by said first setting means is made constant.

4. A motor driving control apparatus according to claim 2, wherein the non-exciting period set by said second setting means is made constant.

5. A motor driving control apparatus according to claim 1, further comprising:
fifth setting means for setting a PWM period having said exciting period and said non-exciting period combined together; and
second changing means for changing the open period set by said fourth setting means in accordance with the PWM period set by said fifth setting means.

6. A motor driving control apparatus according to claim 5, wherein the exciting period set by said first setting means is made constant.

7. A motor driving control apparatus according to claim 5, wherein the non-exciting period set by said second setting means is made constant.

8. A motor driving control apparatus according to claim 1, further comprising:
fifth setting means for setting a PWM period having said exciting period and said non-exciting period combined together;
detecting means for calculating or detecting a motor speed;
comparing means for comparing the motor speed information from said detecting means and a speed data arbitrarily determined; and
changing means for changing the open period by said first setting means in accordance with the result of comparison by said comparing means.

9. A motor driving control apparatus according to claim 8, wherein the exciting period by said first setting means is made constant.

10. A motor driving control apparatus according to claim 8, wherein the non-exciting period set by said second setting means is made constant.

11. A motor driving control apparatus according to claim 1, further comprising:
fifth setting means for setting a PWM period having said exciting period and said non-exciting period combined together;
detecting means for calculating or detecting a motor speed; and
fourth changing means for changing the open period set by open period setting means in accordance with the motor speed information from said detecting means.

12. A motor driving control apparatus according to claim 11, wherein the exciting period set by said first setting means is made constant.

13. A motor driving control apparatus according to claim 11, wherein the non-exciting period set by said second setting means is made constant.

14. A motor driving control apparatus comprising:
exciting means for supplying current from a power source to a motor coil;
first setting means for setting an exciting period to supply current from the power source to the motor coil by said exciting means;
second setting means for setting a non-exciting period not to supply current from the power source to the motor coil by said exciting means; and
PWM means for repeating alternately the current supply to the motor coil during the exciting period set by said first setting means, and the non-supply of current to the motor coil during the non-exciting period set by said second setting means, and
said motor being driven by changing an exciting pattern of said exciting means,
wherein said motor driving control apparatus further comprises
third setting means for setting a short period to enable each of the feeding points of the motor coil to be short-circuited totally during said non-exciting period;
fourth setting means for setting an open period to enable each of the feeding points of the motor coil to be totally in open status;
fifth setting means for setting the value of current flowing in the motor;
detecting means for detecting the motor current flowing in the motor;
sixth setting means for setting the current target value to make the motor current a desired current value;
comparing means for comparing the motor current detected by said detecting means, and the target value set by said sixth setting means; and
controlling means for controlling the motor current set by said fifth setting means in accordance with the result of comparison of said comparing means,
said fifth setting means being provided with changing means for changing the open period.

15. A motor driving control apparatus comprising:

exciting means for supplying current from a power source to a motor coil;

first setting means for setting an exciting period to supply current from the power source to the motor coil by said exciting means;

second setting means for setting a non-exciting period not to supply current from the power source to the motor coil by said exciting means; and PWM means for repeating alternately the current supply to the motor coil during the exciting period set by said first setting means, and the non-supply of current to the motor coil during the non-exciting period set by said second setting means, and said motor being driven by changing an exciting pattern of said exciting means, wherein said motor driving control apparatus further comprises third setting means for setting a short period to enable each of the feeding points of the motor coil to be short-circuited totally during said non-exciting period;

fourth setting means for setting an open period to enable each of the feeding points of the motor coil to be totally in open status;

fifth setting means for setting the value of current flowing in the motor;

detecting means for detecting the motor current flowing the motor;

sixth setting means for setting the current target value to make the motor current a desired current value;

comparing means for comparing the motor current detected by said detecting means, and the target value set by said sixth setting means; and controlling means for controlling the motor current set by said fifth setting means in accordance with the result of comparison of said comparing means, said fifth means being provided with first changing means for changing the open period, second changing means for changing the exciting period, and switching means for switching over said first changing means and said second changing means.

16. A motor driving control apparatus according to claim 15, wherein said switching means is provided with second switching means for selecting said first changing means to perform a feedback current control when the exciting period is controlled, by the feedback control by said second changing means, to be smaller than an arbitrarily set period.

17. A motor driving control apparatus comprising:

exciting means for supplying current from a power source to a motor coil;

first setting means for setting an exciting period to supply current from the power source to the motor coil by said exciting means;

second setting means for setting a non-exciting period not to supply current from the power source to the motor coil by said exciting means; and PWM means for repeating alternately the current supply to the motor coil during the exciting period set by said first setting means, and the non-supply of current to the motor coil during the non-exciting period set by said second setting means, and said motor being driven by changing an exciting pattern of said exciting means, wherein said motor driving control apparatus further comprises third setting means for setting a short period to enable each of the feeding points of the motor coil to be short-circuited totally during said non-exciting period;

fourth setting means for setting an open period to enable each of the feeding points of the motor coil to be totally in open status;

fifth setting means for setting the value of current flowing in the motor;

detecting means for detecting the motor current flowing the motor;

sixth setting means for setting the current target value to make the motor current a desired current value;

comparing means for comparing the motor current detected by said detecting means, and the target value set by said sixth setting means; and controlling means for controlling the motor current set by said fifth setting means in accordance with the result of comparison of said comparing means, said fifth means being provided with first changing means for changing the open period, second changing means for changing a PWM period having said exciting period and said non-exciting period combined together, and switching means for switching over said first changing means and said second changing means.

18. A motor driving control apparatus according to claim 17, wherein said switching means selects said first changing means to perform a feedback current control when the PWM period is controlled, by the feedback control by said controlling means, to be larger than an arbitrarily set period.

* * * * *

UNITED STATES PATENT AND TRADEMARK OFFICE
CERTIFICATE OF CORRECTION

PATENT NO. : 6,664,754 B2
DATED : December 16, 2003
INVENTOR(S) : Hiroyoshi Misumi It is certified that error appears in the above-identified patent and that said Letters Patent is hereby corrected as shown below:

Column 13,
Line 30, "flowing" should read -- flowing in --.

Column 14,
Line 28, "flowing" should read -- flowing in --.

Signed and Sealed this

Sixteenth Day of March, 2004

JON W. DUDAS
*Acting Director of the United States Patent and Trademark Office*